United States Patent [19]

Iizuka

[11] Patent Number: 5,052,781
[45] Date of Patent: Oct. 1, 1991

[54] LENS BARREL

[75] Inventor: Toshimi Iizuka, Kanagawa, Japan

[73] Assignee: Canon Kabushiki Kaisha, Tokyo, Japan

[21] Appl. No.: 495,682

[22] Filed: Mar. 19, 1990

[30] Foreign Application Priority Data

Mar. 28, 1989 [JP] Japan .................... 1-75928

[51] Int. Cl.$^5$ .................... G02B 7/02; G02B 15/00
[52] U.S. Cl. .................... 359/823; 359/704
[58] Field of Search ............. 350/245–257, 350/429–430; 354/195.1, 400; 310/323

[56] References Cited

U.S. PATENT DOCUMENTS

| | | |
|---|---|---|
| 3,793,689 | 12/1988 | Souagi et al. .................... 350/255 |
| 4,456,356 | 6/1984 | Okabe .................... 354/195.13 |
| 4,575,210 | 3/1986 | Yamada et al. .................... 354/400 |
| 4,796,045 | 1/1989 | Hamanishi et al. .................... 354/400 |
| 4,890,132 | 12/1989 | Hama .................... 350/255 |
| 4,911,533 | 3/1990 | Suzuki et al. .................... 350/255 |

*Primary Examiner*—Bruce Y. Arnold
*Assistant Examiner*—Thong Nguyen
*Attorney, Agent, or Firm*—Robin, Blecker, Daley & Driscoll

[57] ABSTRACT

A lens barrel comprising an electric motor as the drive source for a first rotary element, a manually operated second rotary element, a plurality of rolling elements in contact with the first and second rotary elements, a mechanism for moving an optical system, and a third rotary element for driving the moving mechanism as it rotates by rotation of the plurality of rolling elements.

25 Claims, 5 Drawing Sheets

LENS BARREL

BACKGROUND OF THE INVENTION

1. Field of the Invention:

This invention relates to a lens barrel capable of performing both of manual operation and automatic operation by an electric motor.

2. Description of the Related Art:

Recently, in development of video cameras and still cameras, a type of camera having the AF function that performs focus adjustment automatically is taking the main stream. The electric motor is built into, for example, the lens barrel, when a lens system for focus adjustment is driven to effect focusing.

By the way, taking all shots by the automatic focusing operation gives no degree of freedom of making photographs. Also, in photographic conditions that hardly allow accurate automatic focus adjustment to occur, photographs of sharp focus cannot be made. From these accounts, there has been proposed a lens barrel which enables focus adjustment or the like to be carried out in either of the manual mode by the operator's hand and the automatic mode by the motor.

As lens barrels of such a type having both capabilities of manual and automatic modes, there are Japanese Laid-Open Utility Model Application No. Sho 57-54116, and U.S. Pat. Nos. 4,575,210 and 4,796,045.

Since, in the lens barrels of the aforesaid Japanese Laid-Open Utility Model Application No. Sho 57-54116 and U.S. Pat. No. 4,575,210, however, selection of the automatic focus adjustment and the manual focus adjustment is made by using manually operated changeover means, necessities arise that, for the changing over purposes, a clutch mechanism, a switch and other members be employed. This leads to an increase in the complexity of structure of the lens barrel. Thus, the prior art has a difficult problem on mechanisms. As to manageability, too, in some cases, for example, a case where after a shot by the automatic focus adjustment mode, the photographer wants to take the next shot with focusing correction by manual adjustment, another case where he desires to intentionally alter the focusing to a different object distance from that determined by the automatic focus adjustment, and yet another case where as a situation in which the automatic focus adjustment is difficult to do accurately is encountered, the camera has to be switched from the automatic focus adjustment mode to the manual mode, because any of these cases requires the photographer to actuate the changeover means for transition from the automatic mode of focus adjustment to the manual mode, quick selective setting cannot be done in any way. Hence, there are occasions for missing good shutter chances.

Also, in U.S. Pat. No. 4,796,045, the operating mechanism for the optical system is made with inclusion of means for combining a driving torque which comes from the manually operated actuator and another driving torque which comes from the electric motor in the form of a differential gear mechanism.

The operating mechanism of this type, however, because of using the differential gear mechanism in the driving torque composing means, suffers backlash owing to the gears in mesh. Hence, there is a problem that fine focus adjustment is hardly done in the manual mode.

SUMMARY OF THE INVENTION

One aspect of this invention is to provide a lens barrel which enables the automatic focus adjustment mode and the manual focus adjustment mode to be selected without carrying out a special changing over operation, and makes it possible to perform the two modes by means of a great number of spherical rolling elements.

DETAILED DESCRIPTION OF THE PREFERRED EMBODIMENTS

Figure 1:
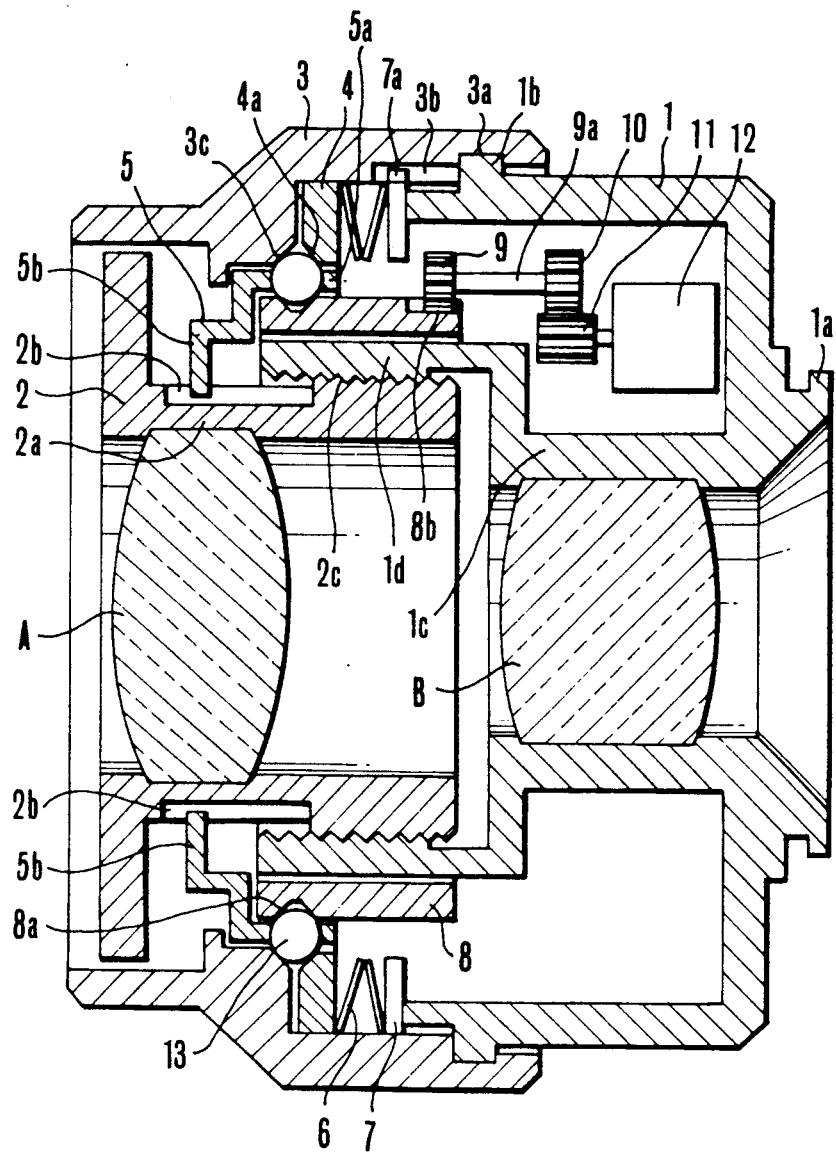
FIG. 1 is a sectional view of a first embodiment of a lens barrel according to the invention.
Figure 2:
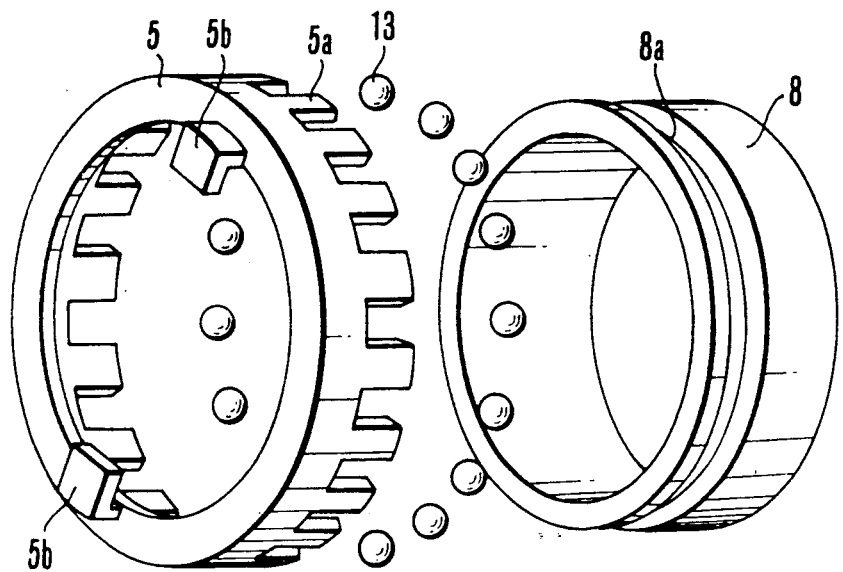
FIG. 2 is an exploded perspective view of the main parts of FIG. 1.

First Embodiment:

FIG. 1 in sectional view shows a first embodiment of the lens barrel according to the invention, and FIG. 2 in exploded perspective view shows the details of its main parts.

Reference numeral 1 denotes a fixed tube having, at the rear end thereof, a mount 1a for coupling the lens barrel to a camera body (not shown), formed in unison with a B-lens holder 1c containing a lens group B, and fixedly carrying an electric motor 12 for automatic focusing. In the fixed tube 1, at its inner front end portion, helicoid threads 1d are formed and engage with helicoid threads 2c of an A-lens barrel portion 2 for focusing to be described later and, at its outer front end portion, a circumferential ridge 1b projects radially outwardly. A circumferential groove 3a of an actuating member 3 for manual focus adjustment of cylindrical shape to be described later is fitted on the ridge 1b so that the member 3 is restrained from axial movement.

The A-lens barrel portion 2 contains a lens group A for focus adjustment. In its outer surface, key grooves 2b for engagement with keys 5b of a rolling element cage 5 to be described later are formed along the direction of an optical axis.

The actuating member 3 for manual focus adjustment has its inner surface formed to a stepped shape. In the inner circumferential edge of its shoulder, a sliding surface 3c is formed, against which rolling elements 13 to be described later abut. In its inner circumferential surface, a key groove 3b for engagement with a key 7a of a washer 7 to be described later is formed along the direction of the optical axis.

The present embodiment is to operatively connect the A-lens barrel portion 2 with each of the actuating member 3 for manual focus adjustment and the motor 12 through a planetary mechanism comprising the rolling elements 13 as the planet member, so that the A-lens barrel portion 2 is made to rotate by the torque of the actuating member 3 for manual focus adjustment, while the torque of the motor 12 is made to rotate the A-lens barrel portion 2 without causing rotation of the actuating member 3 for manual focus adjustment. The structure of this operative connection is described below by using FIG. 1 and FIG. 2.

Reference numeral 8 denotes a sun member in the form of an inner ring of annular shape mounted outside the front end portion of the fixed tube 1 in non-contact state. In the outer surface of its rear end portion, a geared portion 8b is formed and meshes with a small gear 9. The small gear 9 is connected to a large gear 10 through a transmission shaft 9a. This large gear 10 meshes with a motor gear 11 fixed to a drive shaft of the motor 12, so that the inner ring 8 is made to rotate about the optical axis by the rotation of the motor 12. An outer circumferential groove 8a of almost letter "V" shape is formed in the outer surface of the front end portion of the inner ring 8. The rolling elements 13 in the form of small balls constituting the planet member are partly fitted in the groove 8a. The rolling elements 13 are very many in number as shown in FIG. 2. The rolling element cage 5 is formed to a ring shape. In its rear half, an axially elongated comb tooth portion 5a is formed to rotatably hold the rolling elements 13 each one between the adjacent two of the teeth. It is through this comb tooth portion 5a that the rolling elements 13 are fitted in the outer circumferential groove 8a of the inner ring 8. The rolling elements 13 each are fitted without looseness at their central portions in the comb tooth portion 5a. Their exposed portions of the outer peripheral side are pressed against the sliding surface 3c formed in the inner circumferential portion of the actuating member 3 for manual focus adjustment by a rolling element retaining member 4 of ring shape. The rolling element retaining member 4 is fitted in the inner diameter of the actuating member 3 for manual focus adjustment but in non-contact state with the rolling element cage 5. In its inner circumferential edge, a sliding surface 4a is formed and kept in contact with the rolling elements 13.

Again, the rolling element cage 5 fixedly carries a pair of keys 5b at the front portion thereof. These keys 5b each extend radially inwardly into the respective key grooves 2b of the A-lens barrel portion 2, so that rotation of the rolling element cage 5 is transmitted through the keys 5b to the A-lens barrel portion 2. Thereby, the A-lens barrel portion 2 is rotated about the optical axis while simultaneously axially moving to effect focusing.

On the back side of the rolling element retaining member 4, there is provided an initially coned disc spring 6 and, further, on the back side of the initially coned disc spring 6, there is provided a washer 7. The washer 7 is inserted into the interior of the actuating member 3 for manual focus adjustment in such a way that its key 7a engages in the key groove 3b of the actuating member 3 for manual focus adjustment, while its back side abuts on the front end of the fixed tube 1. With this arrangement, the rolling element retaining member 4 is resiliently pressed on the rolling elements 13 through the initially coned disc spring 6 and, at the same time, the rolling elements 13 are pressed on the actuating member 3 for manual focus adjustment.

While the construction and arrangement of the present embodiment are described above, its operation is described below.

In the case of driving the lens barrel in the automatic focus adjustment mode, when the motor 12 for automatic focus adjustment rotates, the driving power is transmitted through the gears 11, 10 and 9 to the geared portion 8b. So, the inner ring 8 rotates around the optical axis.

At this time, the rolling elements 13 are pressed on the sliding surface 3c of the actuating member 3 for manual focus adjustment by the initially coned disc spring 6 through the rolling element retaining member 4, and the actuating member 3 for manual focus adjustment, though being rotatable relative to the fixed tube 1, is given a proper resistance in torque to rotate by the bias force of the initially coned disc spring 6. Moreover, because the washer 7 is mounted to be unable to rotate relative to the actuating member 3 for manual focus adjustment, the actuating member 3 is not rotated at all by the rotating force of the rolling elements 13. Therefore, the rolling elements 13, while rotating on their own axes, perform planetary motion, as they revolve along the outer circumferential groove 8a of the inner ring 8 with the center at the optical axis in the same direction as the inner ring 8. By the revolution of the rolling elements 13, because the rolling element cage 5 holds the rolling elements 13 between the teeth of the comb tooth portion 5a, the rolling element cage 5 rotates in the same direction as the inner ring 8. It should be noted that the revolving speed of the rolling elements 13 is about ½ of the rotating speed of the inner ring 8, and the rolling element cage 5 is rotated at the rotating speed which is reduced to almost ½ of the rotating speed of the inner ring 8. Because the rolling element cage 5 is engaging the A-lens barrel portion 2 through the connection of the keys 5b with the key grooves 2b, the A-lens barrel portion 2 rotates so as to axially move forward by means of the helicoid connection with the fixed tube 1.

Next, in the case of the manual focus adjustment mode, the motor 12 remains stopping. On the assumption that the motor 12 is an iron-cored motor using a permanent magnet, then its cogging force tends to hinder the rotation of the motor drive shaft. Therefore, the inner ring 8 is stopped with a proper holding force. And, on rotation of the actuating member 3 for manual focus adjustment by the operator's hand, because the inner ring 8 does not rotate, the rolling elements 13, while rotating on their own axes, revolve in the same direction as the direction of rotation of the actuating member 3 for manual focus adjustment. The rolling element cage 5, too, is caused to rotate in the same direction. Thus, the A-lens barrel portion 2 is axially moved forward in the same manner as that in the case of motorized driving.

Hence, according to the present embodiment, when focusing the lens manually or automatically, there is no need to do changing over between the manual and automatic modes. Therefore, whichever mode has been used in the preceding focusing operation, one can quickly work the other mode. Moreover, since the planetary mechanism that makes it possible to change over between the manual and automatic operations employs the rolling elements 13 of spherical shape as the planet member, there is nothing like the influence of the backlash of the gears in the prior art. Therefore, the A-lens barrel portion 2 can be axially moved smoothly.

Also, compared with the rotation of the actuating member 3 for manual focus adjustment, the rotation of the rolling element cage 5 is decelerated about ½ times. Therefore, the rotating torque of the rolling element cage 5 becomes, about twice, so that light touch suffices for rotating the actuating member 3 for manual focus adjustment.

Figure 3:
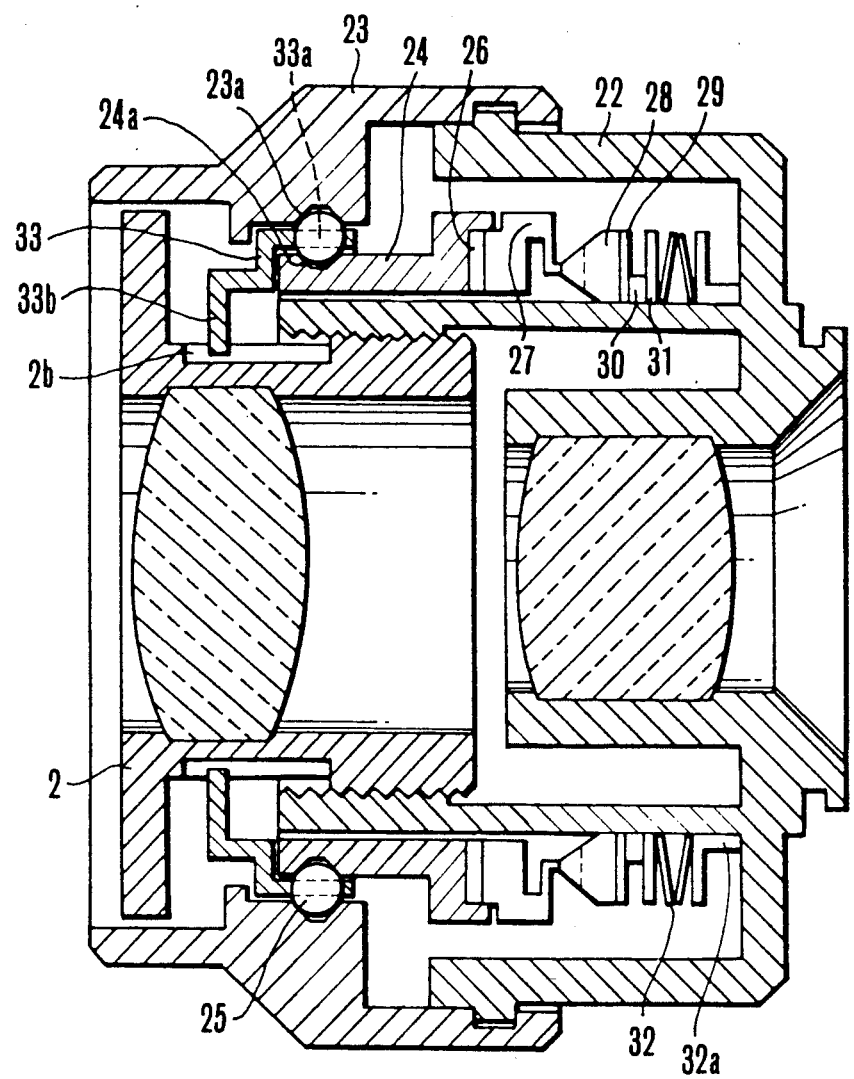
FIG. 3 is a sectional view of a second embodiment.

Second Embodiment:

FIG. 3 shows a sectional view of the second embodiment.

This embodiment is to use a hollowed, cylindrical, vibratory-wave motor shown in FIG. 3 as the drive source for automatic focus adjustment. The lens mounting mechanism itself has almost the same structure as that described in connection with the first embodiment. The force urging the actuating member 23 for manual focus adjustment to abut on the fixed tube 22 with a proper pressure is obtained from an initially coned disc spring 32 that is used for pressing a rotor 27 against a stator 28 in the vibratory-wave motor.

Reference numeral 24 denotes an inner ring pressed on the rotor 27 through a rubber washer 26. In the outer peripheral surface of its front end portion, a rolling element sliding portion 24a whose cross section is of almost letter "V" notch shape, in which the rolling elements 25 partly fit, is formed. Also, in the inner peripheral surface of the front end portion of the actuating member 23 for manual focus adjustment, a rolling element sliding portion 23a whose cross section is of almost letter "V" notch shape, in which the rolling elements 25 partly fit, is formed in radial alignment with the rolling element sliding portion 24a of the inner ring 24. A great number of rolling elements 25 are fitted between both the rolling element sliding portions 23a and 24a, while each rolling element 25 is smoothly movably fitted in a comb tooth portion 33a of a rolling element cage 33. And, a key 33b of the rolling element cage 33 engages in a key groove 2b of the lens barrel portion 2.

That is, the inner ring 24 is pushed to the left as viewed in FIG. 3 by the initially coned disc spring 32 of the vibratory-wave motor to press the rolling elements 25 against the rolling element sliding portion 23a of the actuating member 23 for manual focus adjustment, thereby preventing the rolling elements 25 from slipping and, at the same time, making it possible to give the actuating member 23 for manual focus adjustment a proper resistance in torque against rotation relative to the fixed tube 22. Therefore, similar to the above-described first embodiment, when the vibratory-wave motor is driven, the lens barrel portion 2 can be rotated without rotating the actuating member 23 for manual focus adjustment. Also, even when the actuating member 23 for manual focus adjustment is rotated, the lens barrel portion 2 is rotated. So, focusing of the lens can be done.

Incidentally, reference numeral 29 denotes an electrostrictive element for generating progressive vibratory waves in the stator 28. Reference numerals 30, 31 and 32a are respectively a felt, a washer and a retainer for the initially coned disc spring.

Figure 4:
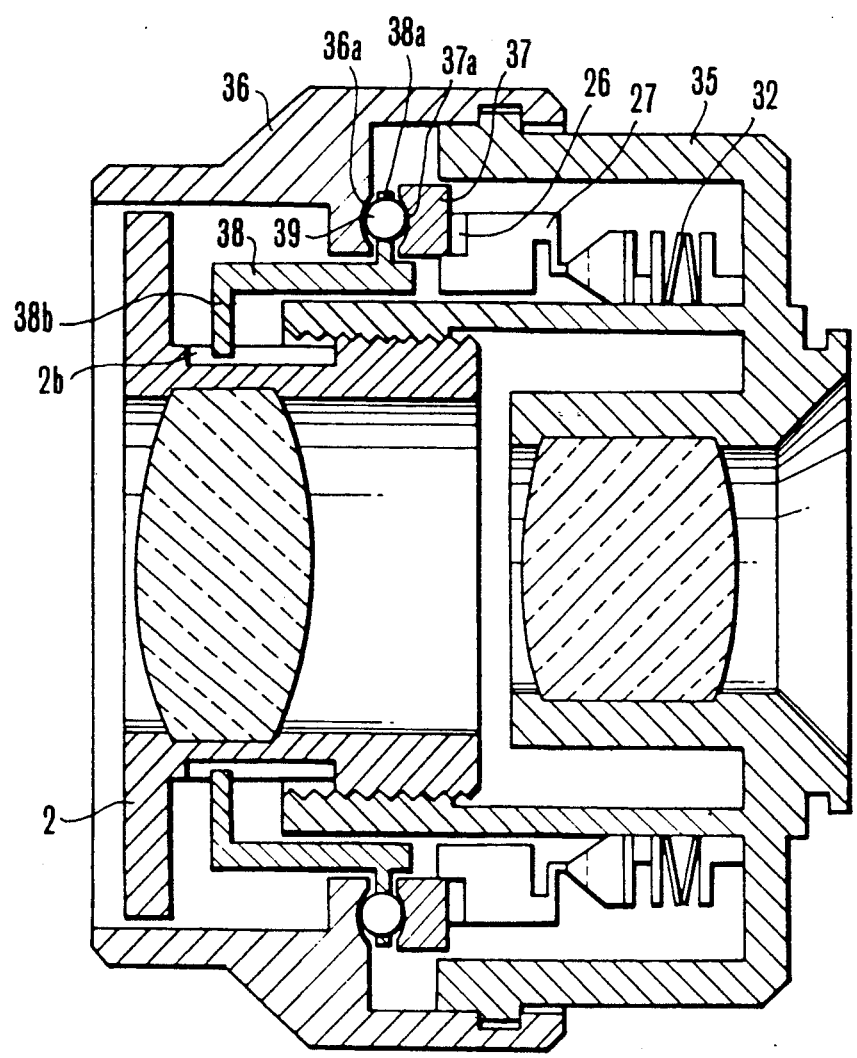
FIG. 4 is a sectional view of a third embodiment.

Third Embodiment:

FIG. 4 shows a sectional view of the third embodiment.

While the above-described second embodiment has the rolling elements 25 sandwiched in diametrical directions relative to the optical axis between the inner and outer surfaces of the actuating member 23 for manual focus adjustment and the inner ring 24, or may be classified to the rolling bearing type, the present embodiment can be classified to the radial bearing type by which hold of rolling elements 39 is kept between an actuating member 36 for manual focus adjustment and a presser ring 37. That surface of the presser ring 37 pressed against the rotor 27 of the vibratory-wave motor through the rubber washer 26 and that surface of the actuating member 36 for manual focus adjustment both of which come into contact with the rolling elements 39, namely, the sliding surfaces 37a and 36a, each are formed to spherically concave shape. By the resilient force of the initially coned disc spring 32 of the vibratory-wave motor, the rolling elements 39 are pressed against the sliding surface 36a of the actuating member 36 for manual focus adjustment.

Figure 5:
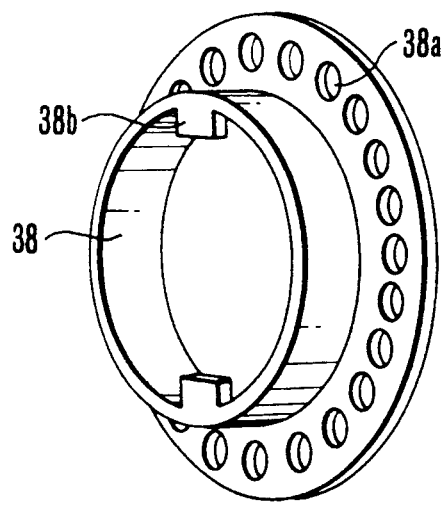
FIG. 5 is a perspective view of the main parts of FIG. 4.

Also, the rolling element cage 38 movably containing the rolling elements 39 is formed as shown in FIG. 5. Its keys 38b engage in the key grooves 2b of the lens barrel portion 2, and the rolling elements 39 are fitted in hole portions 38a without backlash.

That is, the present embodiment is different from the above-described second embodiment only in the method of bearing the rolling elements 39 by using the radial bearing type. In the other features, both are the same. So, description of the operation of this embodiment is omitted.

Figure 6:
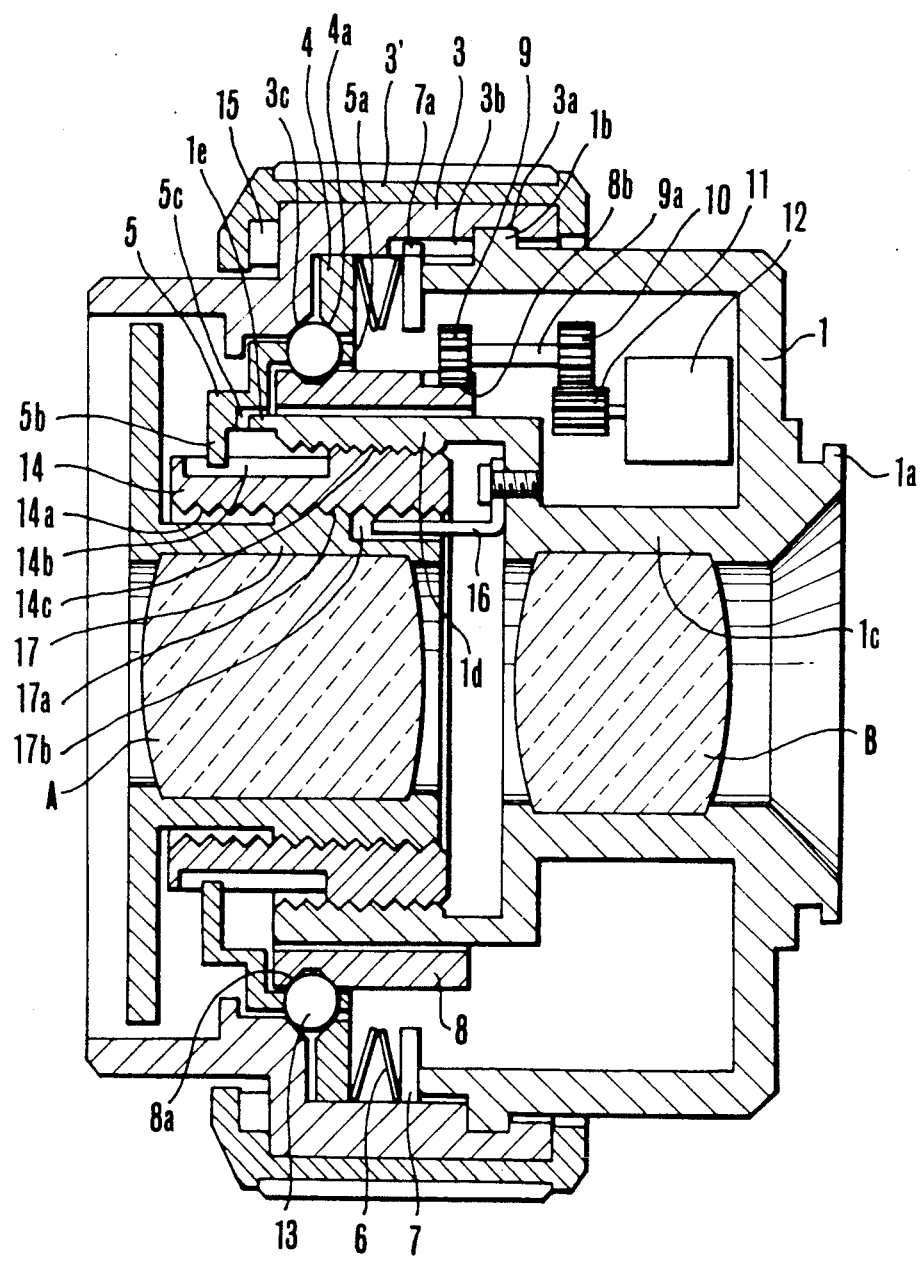
FIG. 6 is a sectional view of a fourth embodiment.

Fourth Embodiment:

While the foregoing embodiments all have been described in connection with the rotation-to-axial movement type of the lens group A for manual focus adjustment, the present embodiment shown in FIG. 6 shows the axial movement-without-rotation type of the lens group A.

The present embodiment is similar in construction to the first embodiment shown in FIG. 1 as far as the differential mechanism is concerned. An actuating tube 3' for manual focus adjustment is rotatably fitted on the outer diameter of the actuating member 3 for manual focus adjustment. Further, a wavy spring washer 15 is employed to exert frictional resistance between the actuating member 3 for manual focus adjustment and the actuating tube 3' for manual focus adjustment when they rotate relative to each other. A lens barrel portion 17 holding a lens group A is restrained from rotation around an optical axis by a key 16 fixedly secured to the fixed tube 1 by a screw fastener engaging in a key groove 17b formed along the optical axis and is so made movable in axial direction. In the A-lens barrel portion 17, a helicoid threaded portion 17a is formed and helicoid-connected to a helicoid thread tube 14. This helicoid thread tube 14 has its helicoid threaded portion 14c in the outer peripheral surface thereof engage with a helicoid threaded portion 1d of the fixed tube 1 and further has a key groove 14b formed along the axial direction into which a key 5b of the rolling element cage 5 engages. And, a stopper piece 5c is formed in the neighborhood of the root of the key 5b of the rolling element cage 5. Also, a stopper extension 1e for cooperation with the stopper piece 5c is formed in the front end portion of the helicoid threaded portion 1d of the fixed tube 1. When the rolling element cage 5 has rotated to a predetermined range, the stopper piece 5c abuts on the stopper extension 1e, thus limiting the rotation of the rolling element cage 5. If, despite this, one dares to rotate the actuating tube 3' for manual focus adjustment, as the actuating member 3 for manual focus adjustment is frictionally connected to the actuating tube 3' for manual focus adjustment, the actuating tube 3' only slips so as not to give unduly large stress to the differential mechanism and others. Letting the frictional force between the actuating member 3 for manual focus adjustment and the actuating tube 3' for manual focus adjustment be denoted by $F_1$, and the frictional force between the whole of rolling elements 13 and the sliding surfaces 4a and 3c by $F_2$, a relationship of $F_1 < F_2$ is set forth.

Incidentally, the limited range of rotation of the rolling element cage 5 corresponds to the focusing range from infinity to the minimum object distance of the photographic optical system.

In operating the lens barrel, either when one rotates the actuating tube 3' for manual focus adjustment, or when the motor 12 rotates, the rolling element cage 5 is rotated, causing the helicoid thread tube 14 to rotate. The A-lens barrel portion 17 which is connected to the helicoid thread tube 14 receives the rotating torque of the helicoid thread tube 14, so that the A-lens barrel portion 17, while being guided by the key 16, is moved axially forward or backward.

As has been described above, according to the present embodiment, one can instantly carry out the manual operation or the automatic operation for axially moving the optical system with or without rotation, since the necessity of the troublesome operation of selectively setting either of the modes is obviated. Moreover, without suffering from the backlash or the like, focusing of the optical system can be operated smoothly.

Also, the use of the vibratory-wave motor as the drive source for the automatic focusing produces an additional advantage that as the bias force of the urging means in the vibratory-wave motor may be used to also serve as the force of pressing the rolling elements on the manually operated actuating member, the number of necessary parts can be so much reduced.

Though, in the above-described embodiments, what is axially driven by the motor is the optical system for focusing, it is, of course, also possible to apply the principle of the invention to a lens barrel in which an optical system for zooming is operated with selection of the automatic and manual modes. Even in this case, similar advantages can be produced.

Also, though, in the above-described embodiments, the balls have been used as the rolling elements for receiving the transmission of the torques of the actuating tube and the motor, it is also possible to use rollers instead of the balls.

What is claimed is:

1. A lens barrel comprising:
   (a) a first rotary element arranged to be rotated by a motor serving as a drive source;
   (b) a second rotary element arranged to be rotated by manual operation;
   (c) a plurality of rolling elements arranged in contact with said first rotary element and said second rotary element;
   (d) a moving mechanism for moving an optical system; and
   (e) a third rotary element arranged to be rotated by rotation of said plurality of rolling elements to drive said moving mechanism.

2. A lens barrel according to claim 1, wherein a plurality of balls is used as said plurality of rolling elements, and wherein said third rotary element supports said plurality of balls individually rotatably.

3. A lens barrel according to claim 2, wherein said third rotary element has either a plurality of holes or grooves along the circumferential direction formed therein, and wherein said plurality of balls is supported by said plurality of holes or grooves.

4. A lens barrel according to claim 1, further comprising means for pressing said plurality of rolling elements against said second rotary element.

5. A lens barrel according to claim 1, wherein said motor is built into said lens barrel.

6. A lens barrel according to claim 2, wherein said first rotary element has a tubular portion, and a groove is formed in the outer peripheral position of said tubular portion in the circumferential direction, and wherein said plurality of balls comes into contact with said first rotary element by fitting in said groove.

7. A lens barrel according to claim 1, wherein said optical system has a lens for focusing.

8. A lens barrel comprising:
   (a) a first rotary element arranged to be rotated by a motor serving as a drive source;
   (b) a second rotary element arranged to be rotated by manual operation;
   (c) a plurality of rolling elements arranged in contact with said first rotary element and said second rotary element;
   (d) a moving mechanism for moving an optical system; and
   (e) a third rotary element arranged to be revolved by rotation of said plurality of rolling elements caused by rotation of said first or second rotary element for driving said moving mechanism.

9. A lens barrel according to claim 8, wherein a plurality of balls is used as said plurality of rolling elements, and wherein said third rotary element supports said plurality of balls individually rotatably.

10. A lens barrel according to claim 9, wherein said third rotary element has either a plurality of holes or grooves along the circumferential direction formed therein, and wherein said plurality of balls are supported by said plurality of holes or grooves.

11. A lens barrel according to claim 8, further comprising means for pressing said plurality of rolling elements against said second rotary element.

12. A lens barrel according to claim 8, wherein said motor is built into said lens barrel.

13. A lens barrel according to claim 9, wherein said first rotary element has a tubular portion, and a groove is formed in the outer peripheral position of said tubular portion in the circumferential direction, and wherein said plurality of balls comes into contact with said first rotary element by fitting in said groove.

14. A lens barrel according to claim 8, wherein said optical system has a lens for focusing.

15. A lens barrel comprising:
   a tube-shaped element arranged to be rotated around an optical axis by a motor serving as a drive source;
   an actuating member arranged to be rotated around the optical axis by manual operation, said actuating member being supported to be only rotatable relative to a fixed tube;
   a plurality of balls positioned between said tube-shaped element and said actuating member, said plurality of balls being arranged to come into contact with both of said tube-shaped element and said actuating member;
   a rotary element supported to be rotatable only around the optical axis, wherein a plurality of support portions is formed in said rotary element along a circumferential direction, and wherein said plurality of balls is rotatably supported by said plurality of support portions; and
   a moving mechanism responsive to rotation of said rotary element for axially moving an optical system, said plurality of balls being arranged to be rotated by rotation of one of said tube-shaped element and said actuating member so as to revolve said rotary element.

16. A lens barrel according to claim 15, wherein said rotary element has either a plurality of holes or grooves formed along a circumferential direction, and wherein said plurality of balls is supported by said plurality of holes or grooves.

17. A lens barrel according to claim 15, further comprising means for pressing said plurality of balls against said actuating member.

18. A lens barrel according to claim 15, wherein said motor is built into said lens barrel.

19. A lens barrel comprising:
   (a) a first rotary element arranged to be rotated by a vibration motor serving as a drive source;
   (b) a second rotary element arranged to be rotated by manual operation;
   (c) a plurality of rolling elements arranged in contact with said first rotary element and said second rotary element;
   (d) a moving mechanism for moving an optical system; and
   (e) a third rotary element arranged to be rotated by rotation of said plurality of rolling elements to drive said moving mechanism,
   (f) said plurality of rolling elements being pressed against said second rotary element by utilizing a pressing force of a spring member housed in said vibration motor.

20. A lens barrel according to claim 19, wherein said vibration motor has an opening with its center at an optical axis through which light from an object to be photographed passes, and rotates around the optical axis.

21. A lens barrel according to claim 20, wherein said spring member housed in said vibration motor is to resiliently press a rotor and a stator against each other.

22. A lens barrel according to claim 21, wherein a plurality of balls is used as said plurality of rolling elements, and wherein said third rotary element supports said plurality of balls individually rotatably.

23. A lens barrel according to claim 22, wherein said third rotary element has either a plurality of holes or grooves along the circumferential direction formed therein, and wherein said plurality of balls is supported by said plurality of holes or grooves.

24. A lens barrel according to claim 22, wherein said first rotary element has a tubular portion, and a groove is formed in the outer peripheral position of said tubular portion in the circumferential direction, and wherein said plurality of balls comes into contact with said first rotary element by fitting in said groove.

25. A lens barrel according to claim 22, wherein said optical system has a lens for focusing.

* * * * *